US009485492B2

(12) United States Patent
Tian et al.

(10) Patent No.: US 9,485,492 B2
(45) Date of Patent: Nov. 1, 2016

(54) COMPRESSION METHODS AND APPARATUS FOR OCCLUSION DATA

(75) Inventors: Dong Tian, Boxborough, MA (US); Wang Lin Lai, Richardson, TX (US)

(73) Assignee: THOMSON Licensing LLC, Princeton, NJ (US)

( * ) Notice: Subject to any disclaimer, the term of this patent is extended or adjusted under 35 U.S.C. 154(b) by 368 days.

(21) Appl. No.: 13/822,057

(22) PCT Filed: Aug. 31, 2011

(86) PCT No.: PCT/US2011/049881
§ 371 (c)(1),
(2), (4) Date: Mar. 11, 2013

(87) PCT Pub. No.: WO2012/036902
PCT Pub. Date: Mar. 22, 2012

(65) Prior Publication Data
US 2013/0176394 A1 Jul. 11, 2013

Related U.S. Application Data

(60) Provisional application No. 61/403,345, filed on Sep. 14, 2010.

(51) Int. Cl.
*H04N 13/00* (2006.01)
*H04N 11/04* (2006.01)
(Continued)

(52) U.S. Cl.
CPC .......... *H04N 13/0048* (2013.01); *H04N 19/17* (2014.11); *H04N 19/30* (2014.11); *H04N 19/597* (2014.11); *H04N 19/70* (2014.11)

(58) Field of Classification Search
CPC ............... H04N 19/597; H04N 19/30; H04N 13/0048; H04N 2213/005; H04N 19/00; H04N 13/0022
USPC ......................................................... 348/43
See application file for complete search history.

(56) References Cited

U.S. PATENT DOCUMENTS 5,327,509 A 7/1994 Rich
5,892,554 A 4/1999 DiCicco et al.
(Continued)

FOREIGN PATENT DOCUMENTS

CA 2557533 9/2005
CN 101166282 4/2008
(Continued)

OTHER PUBLICATIONS

Mahmoudi et.al. "Sparse Representations for Three-Dimensional Range Data Restoration" IMA preprint series#2280 Sep. 2009 (Mona Mahmoudi).*
(Continued)

*Primary Examiner* — Dave Czekaj
*Assistant Examiner* — Tsion B Owens
(74) *Attorney, Agent, or Firm* — Tutunjian and Bitetto, P.C.

(57) ABSTRACT

Methods and apparatus for coding occlusion layers, such as occlusion video data and occlusion depth data in 3D video, are disclosed. A decoding method comprising the steps of: extracting an indicator representative of an original format for received occlusion data, the original format selected from one of a sparse occlusion data format and a filled occlusion data format; arranging 2D data, which is associated with the occlusion data, at location 0 in a reference picture list; decoding the occlusion data to produce decoded occlusion data; when the indicator indicates the sparse occlusion data format for the occlusion data, filling a non-occlusion area of the occlusion data with data indicative of a defined characteristic to produce decoded occlusion data; when the indicator indicates the filled occlusion data format for the occlusion data, replacing the occlusion data in a non-occlusion area of the occlusion data with sample values from a corresponding area of associated 2D data to produce decoded occlusion data; and outputting the decoded occlusion.

14 Claims, 11 Drawing Sheets

(51) Int. Cl.
*H04N 19/597* (2014.01)
*H04N 19/70* (2014.01)
*H04N 19/30* (2014.01)
*H04N 19/17* (2014.01)

(56) References Cited

U.S. PATENT DOCUMENTS

| | | | |
|---|---|---|---|
| 7,058,027 | B1 | 6/2006 | Alessi et al. |
| 7,671,894 | B2* | 3/2010 | Yea .................. H04N 7/181 |
| | | | 348/218.1 |
| 8,345,751 | B2 | 1/2013 | Gunnewiek et al. |
| 8,571,113 | B2 | 10/2013 | Jeon et al. |
| 8,854,428 | B2 | 10/2014 | Suh et al. |
| 2002/0076080 | A1 | 6/2002 | Hecht et al. |
| 2002/0176025 | A1 | 11/2002 | Kim et al. |
| 2004/0119709 | A1 | 6/2004 | Strom et al. |
| 2005/0094726 | A1 | 5/2005 | Park |
| 2006/0146143 | A1 | 7/2006 | Xin et al. |
| 2006/0233239 | A1 | 10/2006 | Sethi et al. |
| 2007/0005795 | A1 | 1/2007 | Gonzalez |
| 2007/0024614 | A1* | 2/2007 | Tam .................. G06T 7/0067 |
| | | | 345/419 |
| 2007/0030356 | A1 | 2/2007 | Yea et al. |
| 2007/0041442 | A1 | 2/2007 | Novelo |
| 2007/0109409 | A1 | 5/2007 | Yea et al. |
| 2007/0121722 | A1 | 5/2007 | Martinian et al. |
| 2008/0117985 | A1 | 5/2008 | Chen et al. |
| 2008/0253671 | A1 | 10/2008 | Choi et al. |
| 2010/0020871 | A1 | 1/2010 | Hannuksela et al. |
| 2010/0020884 | A1 | 1/2010 | Pandit et al. |
| 2010/0034260 | A1 | 2/2010 | Shimizu et al. |
| 2010/0046635 | A1 | 2/2010 | Pandit et al. |
| 2010/0091881 | A1* | 4/2010 | Pandit .................. H04N 5/2628 |
| | | | 375/240.25 |
| 2010/0118942 | A1 | 5/2010 | Pandit et al. |
| 2010/0165077 | A1 | 7/2010 | Yin et al. |
| 2010/0195716 | A1* | 8/2010 | Klein Gunnewiek .......... H04N 19/597 |
| | | | 375/240.08 |
| 2010/0202535 | A1 | 8/2010 | Fang et al. |
| 2010/0226444 | A1 | 9/2010 | Thevathasan et al. |
| 2010/0231689 | A1 | 9/2010 | Bruls et al. |
| 2010/0284466 | A1 | 11/2010 | Pandit et al. |
| 2011/0064302 | A1* | 3/2011 | Ma .................. G06K 9/00275 |
| | | | 382/159 |
| 2011/0122131 | A1 | 5/2011 | Bruls et al. |
| 2011/0122230 | A1 | 5/2011 | Boisson et al. |
| 2011/0142289 | A1 | 6/2011 | Barenbrug et al. |
| 2011/0149037 | A1* | 6/2011 | Van Der Horst .. H04N 13/0048 |
| | | | 348/43 |
| 2011/0211128 | A1 | 9/2011 | Petrides |
| 2011/0261050 | A1 | 10/2011 | Smolic et al. |
| 2011/0291988 | A1 | 12/2011 | Bamji et al. |
| 2012/0007948 | A1 | 1/2012 | Suhs et al. |
| 2012/0007951 | A1 | 1/2012 | Fogel |
| 2013/0033586 | A1 | 2/2013 | Hulyalkar |
| 2013/0162773 | A1 | 6/2013 | Tian et al. |
| 2013/0162774 | A1 | 6/2013 | Tian et al. |
| 2013/0176394 | A1 | 7/2013 | Tian et al. |

FOREIGN PATENT DOCUMENTS

| | | |
|---|---|---|
| CN | 101242530 | 8/2008 |
| CN | 101292538 A | 10/2008 |
| CN | 101309411 | 11/2008 |
| CN | 101415114 | 4/2009 |
| EP | 1727091 | 11/2006 |
| EP | 1806930 | 7/2007 |
| EP | 2197217 | 6/2010 |
| EP | 2464122 | 6/2012 |
| JP | 927969 | 1/1997 |
| JP | 2005130428 | 5/2005 |
| JP | 200822549 | 1/2008 |
| JP | 2008172749 | 7/2008 |
| JP | 2009513074 | 3/2009 |
| JP | 2009532931 | 9/2009 |
| KR | 20080063323 | 7/2008 |
| KR | 100965881 | 6/2010 |
| WO | WO2005083636 | 9/2005 |
| WO | WO2007047736 | 4/2007 |
| WO | WO2007080223 | 7/2007 |
| WO | WO2007081189 | 7/2007 |
| WO | WO2007081926 | 7/2007 |
| WO | WO2007114609 | 10/2007 |
| WO | WO2007126511 | 11/2007 |
| WO | WO2008047316 | 4/2008 |
| WO | WO2008051381 | 5/2008 |
| WO | WO2008054100 | 5/2008 |
| WO | WO2008133455 | 11/2008 |
| WO | WO2008156318 | 12/2008 |
| WO | WO2009001255 | 12/2008 |
| WO | WO2009130561 | 10/2009 |
| WO | WO2010010077 | 1/2010 |
| WO | WO2010096189 | 8/2010 |
| WO | WO2010126608 | 11/2010 |
| WO | WO2010126612 | 11/2010 |
| WO | WO2010126613 | 11/2010 |

OTHER PUBLICATIONS

Huo et al., "A Flexible Reference Picture Selection Method for Spatial Direct Mode in Multview Video Coding", 2008 Congress on Image and Signal Processing, IEEE Explore, 2008, pp. 268-272.

Morvan et al., "Design Consideraions for a 3D-TV Video Coding Architecture", 2008 IEEE.

Morvan et al., "System Architcture for Free-Viewpoint Video and 3D-TV", 2008 IEEE, Apr. 15, 2008, pp. 925-932.

Shimizu et al., "A Backward Compatible 3D Scene Coding Using Residual Predictioini," ICASSP 2008.

Sullivan et al., Editors' Draft Revision to ITU-T Rec. H.264/ISO/IEC 14496-10 Advanced Video Coding—in Preparation for ITU-T SG 16 AAP Consent (In Integrated Form), JTV of ISO/IEC MPEG & ITU-T VCEG, Document: JVT-AA007, Geneva, CH, Jan. 29-Feb. 3, 2009, pp. 1-665.

Itu-T H.264 Standard, "Advanced Video Coding for Generic Audiovisual Services", International Telecommunication Union, Mar. 2008, pp. 1-670.

Kerbiriou et al., "Looking for an Adequate Quality Criterion for Depth Coding", SPIE (Proceedings of), Jun. 17, 2010, pp. 1-11.

Tian et al., "View Synthesis Techniques for 3D Video", Applications of Digital Image Processing XXXII, Proceedings of SPIE, vol. 7443, 2009, Jun. 17, 2010, pp. 1-11.

Fern et al., "Study of Some MPEG Tools Related to 3-D Video", ISO/IEC JTC1/SC29/WG11, MPEG02/M8423, Fairfax, May 2002.

ISO/IEC 23002-3 International Standard, Information Technology—MPEG Video Technologies—Part 3: Representation of Auxiliary Video and Supplemental Information, Committee Draft, Jan. 19, 2007, 32 Pages.

Bruls et al., "Philips 3DV EE1,2,3,4 Results", ISO/IEC JTC1/SC29/WG11, Coding of Moving Pictures and Audio, Lausanne Switzerland, Feb. 2009, pp. 1-17.

Chen et al., "Operation Point and View Dependency Changes SEI Messages for MVC", JVT of ISO/IEC MPEG & ITU-T VCEG, San Jose, CA, 223 Apr. 2007.

Grewatsch et al., "Sharing of Motion Vectors in 3D Video Coding", Image Processing, 2004, ICIP '04, International Conference on Singapore, vol. 5, Oct. 24-27, 2004, pp. 3271-3274.

Merkle et al., "Efficient Compression of Multi-view Depth Data Based on MVC", 3DTV Conference 2007, IEEE, PI, May 1, 2007, pp. 1-4.

Oh et al., "H.264-Based Depth Map Sequence Coding Using Motion Information of Corresponding Texture Video", Advances in Image ad Video Technology Lecture Notes in Computer Science, LNCS, Berlin, DE, Jan. 1, 2006, pp. 898-907.

Chen et al., On MVC Reference Picture List Construction, JVT of ISO/IEC MPEG & ITU-T VCEG, Document: JVT-V043, Marrakech, Morocco, Jan. 13-19, 2007.

(56) References Cited

OTHER PUBLICATIONS

Chen et al., "WD 4 Reference Software for MVC, Section "MVC Software Manual"", 29, JVT Meeting, Nov. 19, 2008, Geneva, Switzerland, pp. 1-26.
Pandit et al., "H.264/AVC Extension for MVC Using SEI Message", JVT of ISO/IEC MPEG & ITU-T VCEG, Docment: JVT-X061, Geneva Switzerland, Jun. 29-Jul. 6, 2007, pp. 1-14.
Yip et al., "Joint Source and Channel Coding for H.264 Compliant Stereoscopic Video Transmission", CCECE/CCGEI, Saskatoon, 2005 IEEE, May 2005.
Bruls et al, "Options for a New Efficient, Compatible, Flexible 3D Standard," 2009 16th IEEE International conference on Image Processing, Nov. 7, 2009, pp. 3497-3500.
Bruls et al., "Proposal to Amendment MPEG-C Part 3," ISO/IEC JTC1/SC29/WG11, vol. MPEG2007, No. M14700, Jul. 1, 2007, pp. 1-7.
Lopez et al., "3DV EE3 results on lovebird1 and leavinglaptop sequence," MPEG Meeting Oct. 13-17, 2008, Busan, ISO/IEC JTC1/SC29/WG11, No. M15802, 8 pages, Oct. 9, 2008.
Ho et al., "Overview of Mutliview Video Coding," Gwangju Institute of Science and Technology (GIST), Jun. 27-30, 2007, pp. 5-12.
Shimizu et al. "Free Viewpoint Scalable Multiview Video Coding Using Panoramic Mosaic Depth Maps," NTT Cyber Space Laboratories, Ntt Corp., Japan, Aug. 2008, pp. 1141-1144.
Office Action for related U.S. Appl. No. 13/138,956 dated Jan. 26, 2015.
Office Action for related U.S. Appl. No. 13/138,956 dated Jul. 2, 2014.
Office Action for related U.S. Appl. No. 13/318,412 dated Dec. 27, 2014.
Office Action for U.S. Appl. No. 13/318,412 dated Mar. 27, 2014.
Office Action for U.S. Appl. No. 13/318,418 dated Dec. 27, 2014.
International Search Report for PCT/US2011/049877 dated Oct. 18, 2011.
International Search Report for PCT/US2011/049881 dated Oct. 18, 2011.
International Search Report for PCT/US2011/049886 dated Oct. 24, 2011.
International Search Report for PCT/US2010/001286 dated Oct. 11, 2010.
International Search Report for PCT/US2010/001291 dated Oct. 20, 2010.
International Search Report for PCT/US2010/001292 dated Sep. 29, 2010.
Marpe, Detlev, et.al., "The H. 264/MPEG4 advanced video coding standard and its applications." Communications Magazine, IEEE 44.8 (2006): 134-143.
Final Office Action for Related U.S. Appl. No. 13/822,031 dated Jan. 15, 2016.
Notice of Grant for Related U.S. Appl. No. 13/822,064 dated Apr. 27, 2015.
CN Search Report for corresponding CN Appln No. 201080029871.6 dated Jan. 17, 2014.
CN Search Report for Corresponding CN Appln No. 2010800296161 dated Mar. 14, 2014.
CN Search Report for Corresponding CN Appln No. 2010800296161 dated Dec. 5, 2014.
CN Search Report for Corresponding CN Appln No. 201080029607.2 dated Mar. 26, 2014.

\* cited by examiner

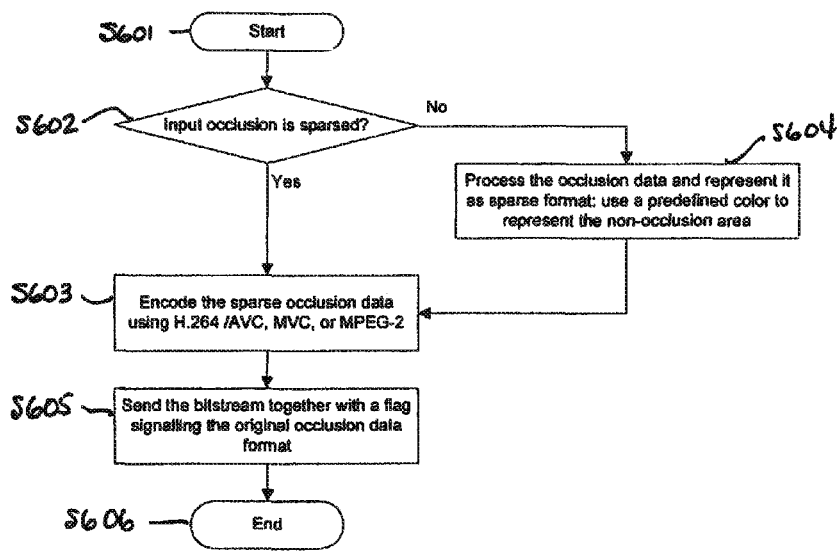
Fig. 6 Flowchart of encoding the occlusion data using a conventional encoder

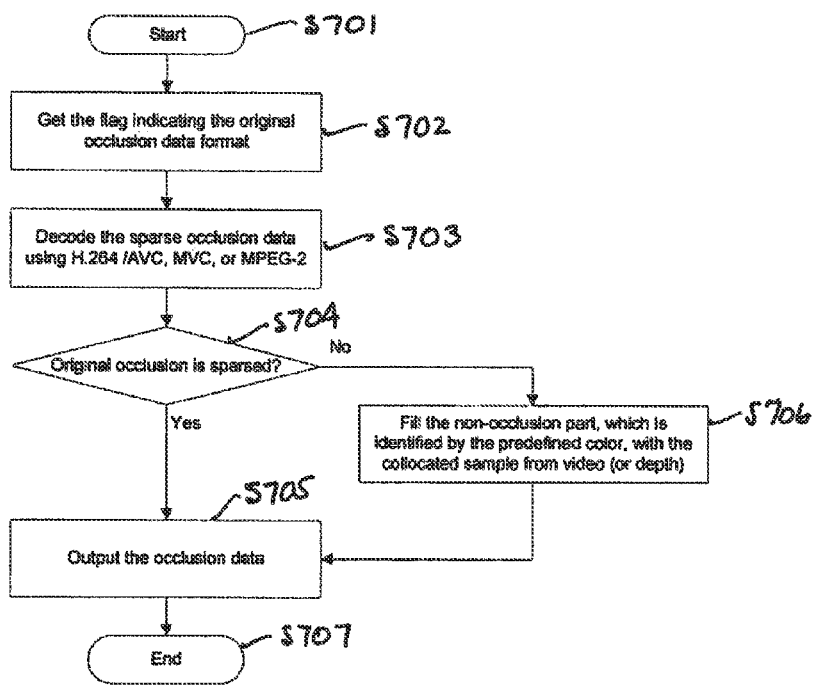
Fig. 7 Flowchart of decoding the occlusion data using a conventional decoder

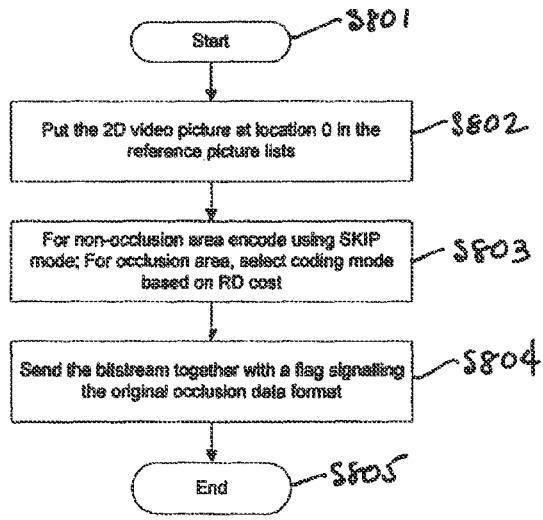
Fig. 8 Flowchart of encoding the occlusion video
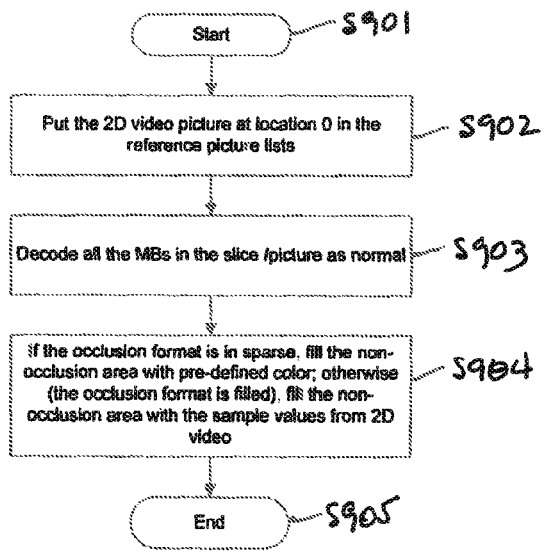
Fig. 9 Flowchart of decoding the occlusion video

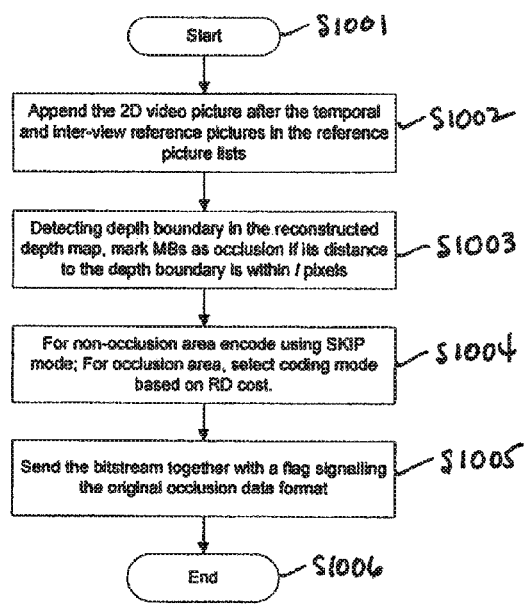
Fig. 10 Flowchart of encoding the occlusion video using depth skip mode

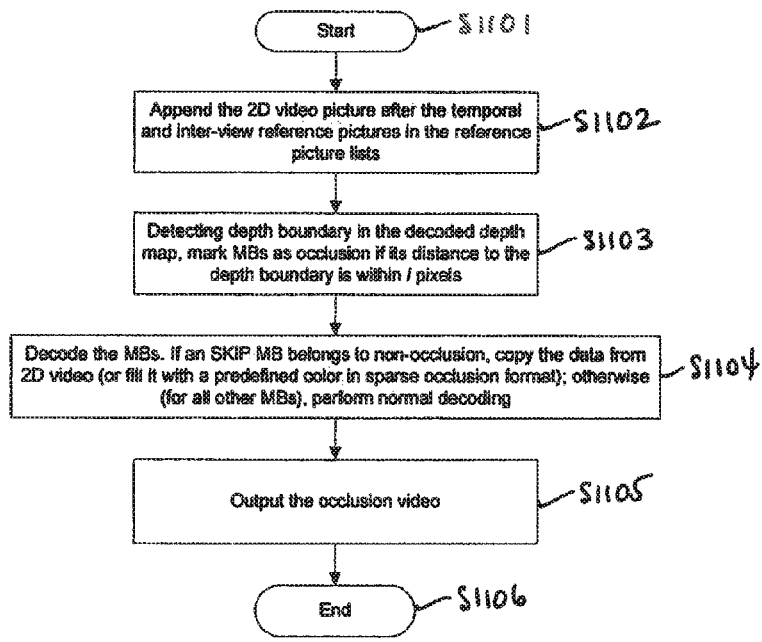
Fig. 11 Flowchart of decoding the occlusion video using depth skip mode
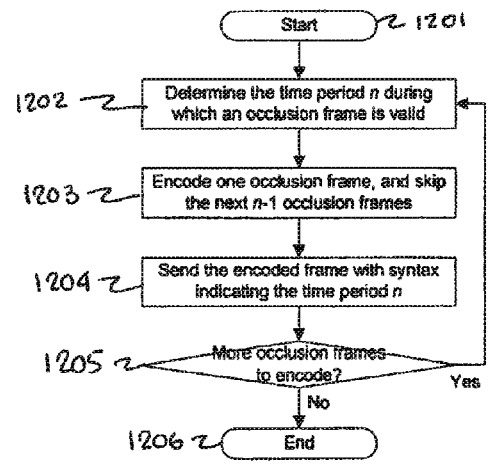
Fig. 12 Flowchart of encoding the occlusion video using update

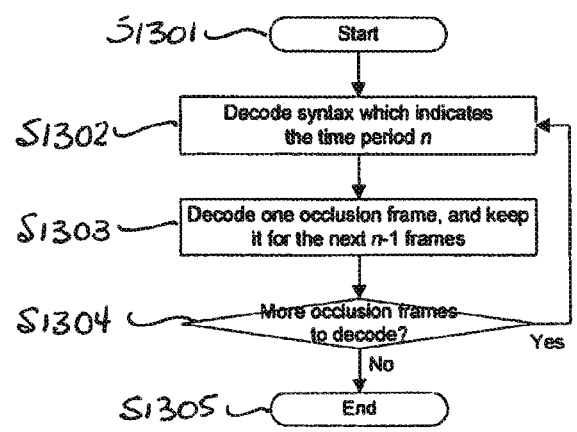
Fig. 13 Flowchart of decoding the occlusion video using update

COMPRESSION METHODS AND APPARATUS FOR OCCLUSION DATA

This application claims the benefit, under 35 U.S.C. §365 of International Application PCT/US2011/049881, filed Aug. 31, 2011, which was published in accordance with PCT Article 21(2) on Mar. 22, 2012 in English and which claims the benefit of United States provisional patent application No. 61/403,345, filed Sep. 14, 2010.

The present application is related to the following co-pending, commonly owned patent applications: PCT Application No. PCT/US2010/001286 entitled "3D Video Coding Formats", having an international filing date of Apr. 30, 2010; PCT Application No. PCT/US2010/001291 entitled "Reference Picture Lists for 3DV," having an international filing date of Apr. 30, 2010; and PCT Application No. PCT/US2010/001292 entitled "Inter-Layer Dependency Information for 3DV", having an international filing date of Apr. 30, 2010.

The present invention relates to video coding systems and, more particularly, to three dimensional (3D) image coding and decoding systems.

Television programming is becoming more widely available in 3D. Sporting events and concerts have been broadcast for home consumption. As 3D component sales ramp up and as the demand for 3D grows, it is expected that 3D programming will be offered widely on most of the popular TV channels in the near future.

In order to facilitate new video applications such as 3D television and free-viewpoint video (FVV), 3D video data formats consisting of both conventional 2D video and depth—generally referred to as "2D data"—can be utilized such that additional views can be rendered for the end user or viewer. There are a number of different 3D video formats including, for example: 2D plus depth (2D+Z), Layered Depth Video (LDV), Multiview plus Depth (MVD), Disparity Enhanced Stereo (DES), and Layer Depth Video plus Right View (LDV+R), to name a few. The 2D plus depth (2D+Z) format consists of a 2D video element and its corresponding depth map. The Layered Depth Video (LDV) format includes the 2D+Z format elements and occlusion video together with occlusion depth. The Multiview plus Depth (MVD) format consists of a set of multiple 2D+Z formatted elements, each 2D+Z formatted element related to a different viewpoint. The Disparity Enhanced Stereo (DES) format is composed of two LDV formatted elements, wherein each LDV formatted element is related to one of two different viewpoints. The Layer Depth Video plus Right View (LDV+R) format is composed of one LDV formatted element from a left view and the 2D video element from a right view.

Coding has been used to protect the data in these various formats as well as to gain possible transmission or even processing efficiencies. Coding, as the term is contemplated for use herein, should be understood to encompass encoding and decoding operations. It is typically a challenging task to code the 3D content usually involving multiple views and possibly corresponding depth maps as well. Each frame of 3D content may require the system to handle a huge amount of data. Although the coding of such formatted data remains a subject of ongoing research, at least one framework for encoding and decoding much of the 3D video content in these formats is known to have been presented in PCT Application No. PCT/US2010/001286, which has been identified above. Nonetheless, it appears that most coding efforts are directed primarily toward the actual video or textural information as opposed to supplemental data such as depth and occlusion data.

Occlusion data, either occlusion video or occlusion depth, is not directly viewed by, or presented to, an end user viewing a TV display. Instead, it is used for virtual view rendering purposes by a receiver. Occlusion data exhibits different characteristics from normal video or depth information. It typically contains pixel values (i.e., for occlusion video data) or depth values (i.e., for occlusion depth data) that are invisible from a TV viewer's observation point. No techniques are presently known for efficiently handling and coding occlusion data in spite of the fact that occlusion data had surfaced in the LDV format within MPEG 3DV Ad Hoc group at least as early as 2008.

Some coding experiments on the LDV format were performed using multi-view video coding (MVC), in which the occlusion data are treated as a normal 2D view. However, the approach is not an efficient way to handle the occlusion video data and the occlusion depth data.

Limitations in transmission bandwidth, storage capacity, and processing capacity, for example, in the face of growing demand for affordable 3D content will continue to underscore the need for greater efficiency throughout the 3D system. Yet, none of the techniques known in the art are suitable for coding occlusion data efficiently. Hence, a more efficient coding technique for occlusion data, including both occlusion video data and occlusion depth data, appears to be needed in order to provide greater system efficiencies in the processing, storage, and transmission of 3D content.

The coding treatment for occlusion data so far appears to ignore the fact that occlusion data is referenced infrequently in the rendering process, if at all, and only small areas in a frame of occlusion data is typically used at any single point in the rendering process. Typically, the occlusion video is referenced when holes are observed after a view has been warped to a virtual position. Even then, reference is only made to one or more small areas of the occlusion video corresponding to the position of the holes in the warped view. A similar rationale applies to use of occlusion depth. These observations are then useful in developing an efficient coding strategy for the occlusion data.

In accordance with the principles of the present invention, coding methods for occlusion layers, such as occlusion video data and occlusion depth data in 3D video, are directed to improving the transmission and processing efficiency in systems handling this data. These coding methods for occlusion data include: indication of occlusion format; conversion of all occlusion data into a sparse data format; filling non-occlusion areas or macroblocks with a defined characteristic, such as a single color; rearranging the placement of the 2D data within the reference picture list; the use of proximity to depth boundaries to detect occlusion and non-occlusion areas or macroblocks; the use of skip mode coding for non-occlusion areas or macroblocks; the use of rate distortion cost for coding occlusion areas macroblocks; and the coding of a single occlusion frame while skipping the next n−1 occlusion frames. Each of these techniques, whether applied separately or in combination, affords improved and even significantly enhanced coding and transmission gains for the overall bitstreams of 3D data.

According to an aspect of the present principles, there is provided a method for processing occlusion data in a sequence of video data frames, the method includes the steps of: determining a format for the occlusion data, the format selected from a one of a sparse occlusion data format and a filled occlusion data format; when the format for the occlusion data is determined to be the filled occlusion data format, converting the occlusion data into a sparse occlusion data format before encoding; arranging 2D data, which is associated with the occlusion data, at location 0 in a reference picture list; identifying at least one of an occlusion area macroblock and a non-occlusion area macroblock for the occlusion data; encoding the occlusion data to produce encoded occlusion data, wherein for each non-occlusion area macroblock the encoding is realized by skip mode encoding, and wherein for each occlusion area macroblock the encoding is realized by selecting an encoding mode based on rate distortion cost; and outputting the encoded occlusion data together with an indicator representative of the format determined for the occlusion data.

According to an aspect of the present principles, there is provided an apparatus for processing occlusion data in a sequence of video data frames, the apparatus includes an encoder for: determining a format for the occlusion data, the format selected from a one of a sparse occlusion data format and a filled occlusion data format; when the format for the occlusion data is determined to be the filled occlusion data format, converting the occlusion data into a sparse occlusion data format before encoding; arranging 2D data, which is associated with the occlusion data, at location 0 in a reference picture list; identifying at least one of an occlusion area macroblock and a non-occlusion area macroblock for the occlusion data; encoding the occlusion data to produce encoded occlusion data, wherein for each non-occlusion area macroblock the encoding is realized by skip mode encoding, and wherein for each occlusion area macroblock the encoding is realized by selecting an encoding mode based on rate distortion cost; and outputting the encoded occlusion data together with an indicator representative of the format determined for the occlusion data.

According to an aspect of the present principles, there is provided a method for processing occlusion data in a sequence of video data frames, the method includes the steps of: extracting an indicator representative of an original format for received occlusion data, the original format selected from one of a sparse occlusion data format and a filled occlusion data format; arranging 2D data, which is associated with the occlusion data, at location 0 in a reference picture list; decoding the occlusion data to produce decoded occlusion data; when the indicator indicates the sparse occlusion data format for the occlusion data, filling a non-occlusion area of the occlusion data with data indicative of a defined characteristic to produce decoded occlusion data; when the indicator indicates the filled occlusion data format for the occlusion data, replacing the occlusion data in a non-occlusion area of the occlusion data with sample values from a corresponding area of associated 2D data to produce decoded occlusion data; outputting the decoded occlusion.

According to an aspect of the present principles, there is provided an apparatus for processing occlusion data in a sequence of video data frames, the apparatus includes a decoder for: extracting an indicator representative of an original format for received occlusion data, the original format selected from one of a sparse occlusion data format and a filled occlusion data format; arranging 2D data, which is associated with the occlusion data, at location 0 in a reference picture list; decoding the occlusion data to produce decoded occlusion data; when the indicator indicates the sparse occlusion data format for the occlusion data, filling a non-occlusion area of the occlusion data with data indicative of a defined characteristic to produce decoded occlusion data; when the indicator indicates the filled occlusion data format for the occlusion data, replacing the occlusion data in a non-occlusion area of the occlusion data with sample values from a corresponding area of associated 2D data to produce decoded occlusion data; outputting the decoded occlusion.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations. Other aspects and features will become apparent from the following detailed description considered in conjunction with the accompanying drawings and the claims.

The above-mentioned and other features and advantages of this invention, and the manner of attaining them, will become more apparent and the invention will be better understood by reference to the following description of embodiments of the invention taken in conjunction with the accompanying drawings, wherein:

FIGS. 6 and 7 show flowcharts for one embodiment of encoding and decoding of occlusion data involving an indication of sparse and filled occlusion data together with a keying technique for the occlusion data, realized in accordance with the principles of the present invention;

FIGS. 8 and 9 show flowcharts for a second embodiment of encoding and decoding of occlusion data involving the use of skip mode for occlusion data, realized in accordance with the principles of the present invention;

FIGS. 10 and 11 show flowcharts for a third embodiment of encoding and decoding of occlusion data involving the use of depth skip mode for occlusion data, realized in accordance with the principles of the present invention;

FIGS. 12 and 13 show flowcharts for fourth embodiment of encoding and decoding of occlusion data involving the use of updates for occlusion data, realized in accordance with the principles of the present invention.

Figure 1:
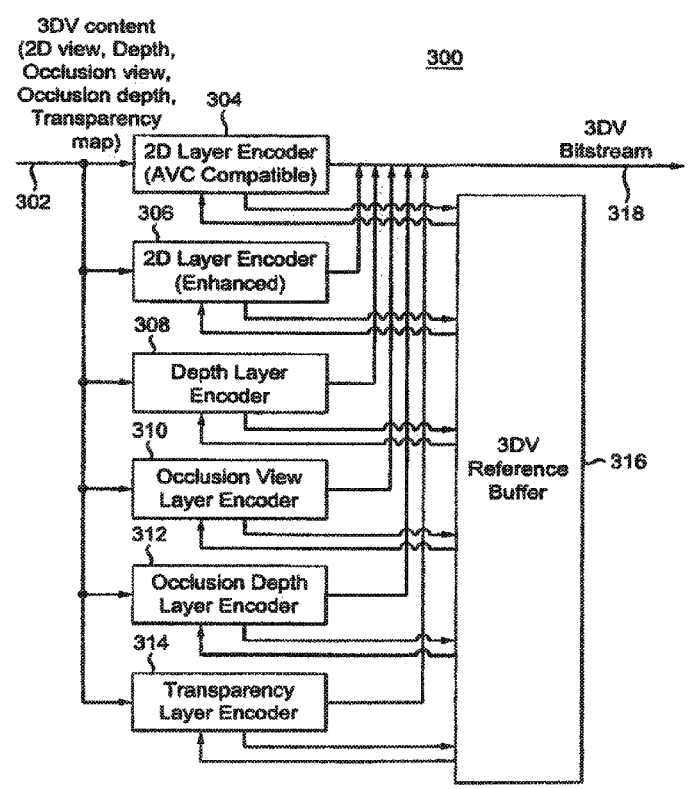
FIG. 1 is a block diagram for an exemplary 3D video (3DV) encoder.

The exemplary embodiments set out herein illustrate preferred embodiments of the invention, and such exemplary embodiments are not to be construed as limiting the scope of the invention in any manner.

Coding methods for occlusion layers, such as occlusion video data and occlusion depth data, are described herein directed to improving the transmission and processing efficiency in systems handling this data. Several improved coding techniques are disclosed. Additionally, the description also includes information about syntaxes for inclusion in frame headers or overhead messages to communicate details about the actual type of occlusion data and other information useful in the practice of the present invention.

It is intended that the encoding and decoding techniques described herein are applicable to occlusion data, in general, whether that data is occlusion depth data or occlusion video data, unless one specific kind of occlusion data is expressly specified. Moreover, it is also intended that the encoding and decoding techniques described herein are applicable to any format of the occlusion data, in general, whether that data format is sparse or filled, unless one specific type of occlusion data format is expressly specified.

It is important to describe certain terms so that they are properly understood in the context of this application. Certain useful terms are defined below as follows:

"2D data" includes one or both of the 2D video data and depth data, wherein the term "data" can be used interchangeably with the term "layer".

A "2D video" layer is generally used herein to refer to the traditional video signal.

A "depth" layer is generally used herein to refer to data that indicates distance information for the scene objects.

A "depth map" is a typical example of a depth layer.

An "occlusion video" layer is generally used herein to refer to video information that is occluded from a certain viewpoint. The occlusion video layer typically includes background information for the 2D video layer.

An "occlusion depth" layer is generally used herein to refer to depth information that is occluded from a certain viewpoint. The occlusion depth layer typically includes background information for the depth layer.

A "transparency" layer is generally used herein to refer to a picture that indicates depth discontinuities or depth boundaries. A typical transparency layer has binary information, with one of the two values indicating positions for which the depth has a discontinuity, with respect to neighboring depth values, greater than a particular threshold.

A "3DV view" is defined herein as a data set from one view position, which is different from the "view" used in MVC. For example, a 3DV view may include more data than the view in MVC. For the 2D+Z format, a 3DV view may include two layers: 2D video plus its depth map. For the LDV format, a 3DV view may include four layers: 2D video, depth map, occlusion video, and occlusion depth map. In addition, a transparency map can be another layer data type within a 3DV view, among others.

A "3DV layer" is defined as one of the layers of a 3DV view. Examples of 3DV layers are, for example, 2D view or video, depth, occlusion video, occlusion depth, and transparency map. Layers other than 2D view or video are also defined as "3DV supplemental layers". In one or more embodiments, a 3DV decoder can be configured to identify a layer and distinguish that layer from others using a 3dv layer id. In one implementation, 3dv layer id is defined as in the Table 1. However, it should be noted that the layers may be defined and identified in other ways, as understood by those of ordinary skill in the art in view of the teachings provided herein.

TABLE 1

3DV layers

| Value of 3d_layer_id | Description |
| --- | --- |
| 0 | 2D video |
| 1 | Depth |
| 2 | Occlusion video |
| 3 | Occlusion depth |
| 4 | Transparency map |
| ≥5 | Reserved |

In a generic 3DV coder/decoder (codec) framework such as the one described in PCT Application No. PCT/US2010/001286, as identified above, occlusion video and occlusion depth are treated in a specific 3DV layer making it possible to design new or additional coding modes. In the present description, the 3DV codec framework from FIGS. 3-6 in PCT Application No. PCT/US2010/001286 is included herein as FIGS. 1-4, respectively. For further details about this framework, it is recommended that reference be made to PCT Application No. PCT/US2010/001286.

Figure 2:
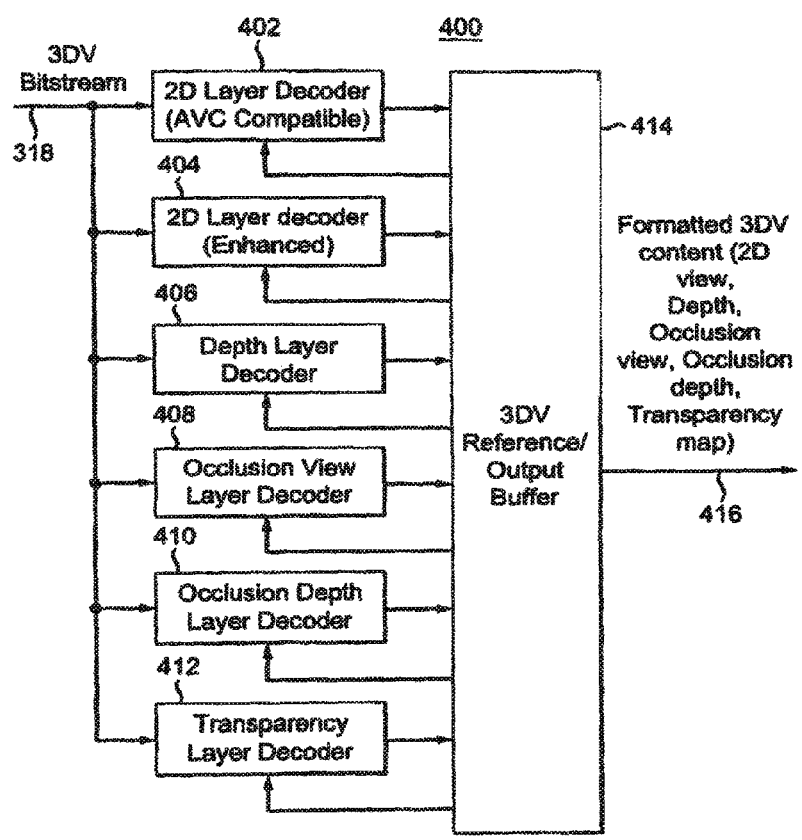
FIG. 2 is a block diagram for an exemplary 3D video (3DV) decoder.

FIGS. 1 and 2 illustrate a high-level generic 3DV encoder 300 and decoder 400, respectively. The encoder 300/decoder 400 is composed of layer encoders/decoders and a 3DV reference buffer. For example, a 3DV content signal 302, which may include, for example, 2D view, depth, occlusion view, occlusion depth, and transparency map layers, is input to the various layer encoders as shown in FIG. 1. Specifically, the encoder system/apparatus 300 includes a 2D layer encoder 304 configured to encode 2D layers, which may be AVC compatible, an enhanced 2D layer encoder 306 configured to encode enhanced 2D layers, a depth layer encoder 308 configured to encode depth layers, an occlusion view layer encoder 310 configured to encode occlusion view layers, an occlusion depth layer encoder 312 configured to encode occlusion depth layers, and a transparency layer encoder 314 configured to encode transparency layers. Thus, each layer can be encoded using a different encoder and/or encoding technique.

An enhanced 2D layer is generally used herein to distinguish such a layer from a layer that is compatible with AVC, MVC, SVC, or some other underlying standard. For example, enhanced 2D layers are typically not compatible with MVC because such layers allow new coding tools, such as, for example, using inter-layer references. Such layers are, therefore, generally not backward compatible with MVC.

Note that the term "enhanced 2D layer' (or supplemental layer) may also be used to refer to layers that could be coded with MVC, but which would not be expected to be displayed and so are not typically described as being coded with MVC. For example, a series of depth layers could be treated by MVC as a series of pictures and could be coded by MVC. However, it is not typical to display depth layers, so it is often desirable to have a different way of identifying and coding such layers, other than by using MVC.

Each layer can also use a different reference. The reference may be from a different layer than the picture/block being encoded (decoded). The references from different layers may be obtained from a 3DV Reference Buffer 316 (3DV Reference/Output Buffer 414). As shown in FIG. 1, each layer encoder is in signal communication with the 3DV reference buffer 316 to permit various modes of encoding of the input signal 302 to generate an output signal 318.

By utilizing the 3DV Reference Buffer 316, each layer of the 3DV format can be encoded using references from its own layer, such as, for example, temporal references and/or inter-view references within the same layer with motion and/or disparity compensation, and/or using inter-layer prediction between the various layers. For example, an inter-layer prediction may reuse motion information, such as, for example, motion vector, reference index, etc., from another layer to encode the current layer, also referred to as motion skip mode. In this way, the output signal 318 may be interleaved with various layer information for one or more 3DV views. The inter-layer prediction may be of any kind of technique that is based on the access of the other layers.

With regard to the decoder system/apparatus 400, system 400 includes various layer decoders to which signal 318 may be input as shown in FIG. 2. In particular, the encoder system/apparatus 400 includes a 2D layer decoder 402, which may be AVC compatible, configured to decode 2D layers, an enhanced 2D layer decoder 404 configured to decode enhanced 2D layers, a depth layer decoder 406 configured to decode depth layers, an occlusion view layer decoder 408 configured to decode occlusion view layers, an occlusion depth layer decoder 410 configured to decode occlusion depth layers, and/or a transparency layer decoder 412 configured to decode transparency layers.

As illustrated in FIG. 2, each layer decoder is in signal communication with a 3DV reference/output buffer 414, which can be configured to parse decoded layer information received from the layer decoders and to determine how the layers included in the input signal fit into a structure that supports 3D processing. Such 3D processing may include, for example, coding of 3D layers as described herein or rendering (synthesizing) of additional pictures at a receiver or display unit. Rendering may use, for example, depth pictures to warp a 2D video and/or occlusion pictures to fill in holes of a rendered picture with background information.

In addition, the 3DV reference/output buffer 414 can be configured to generate an output signal 416 in a 3DV compatible format for presentation to a user. The formatted 3DV content signal 416 may, of course, include, for example, 2D view, depth, occlusion view, occlusion depth, and transparency map layers. The output buffer may be implemented together with the reference buffer, as shown in FIG. 2, or, alternatively in other embodiments, the reference and output buffers may be separated.

Other implementations of the encoder 300 and the decoder 400 may use more or fewer layers. Additionally, different layers than those shown may be used. It should be clear that the term "buffer", as used in the 3DV Reference Buffer 316 and in the 3DV Reference/Output Buffer 414, is an intelligent buffer. Such buffers may be used, for example, to store pictures, to provide references (or portions of references), and to reorder pictures for output. Additionally, such buffers may be used, for example, to perform various other processing operations such as, for example, hypothetical reference decoder testing, processing of marking commands (for example, memory management control operations in AVC), and decoded picture buffer management.

Figure 3:
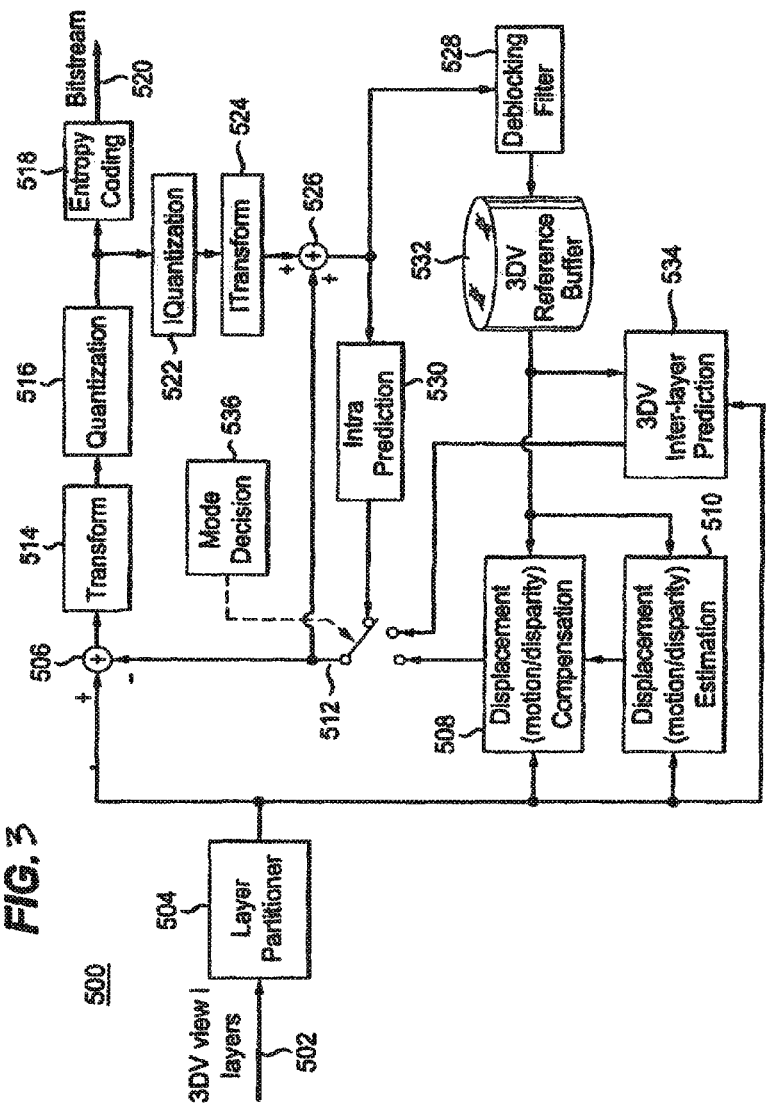
FIG. 3 is a block diagram for an exemplary 3D video (3DV) layer encoder.
Figure 4:
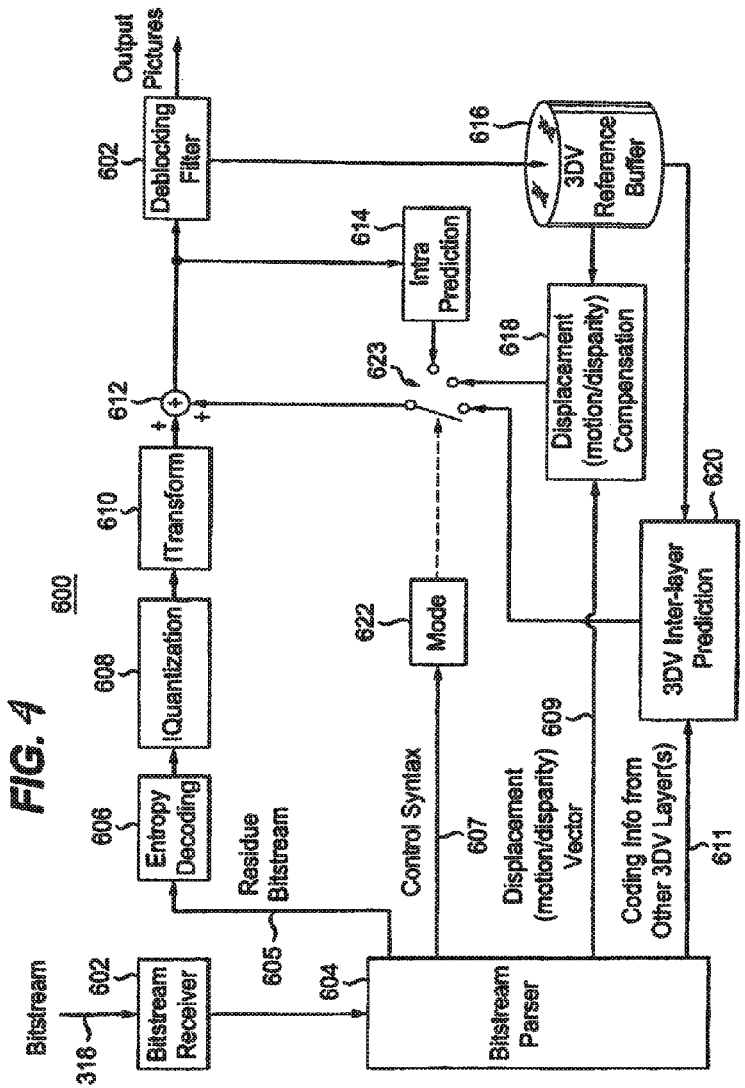
FIG. 4 is a block diagram for an exemplary 3D video (3DV) layer decoder.

FIGS. 3 and 4 respectively depict high level block/flow diagrams of a general 3DV layer encoder 500 and decoder 600, respectively, that can be used to implement any one or more of layer encoders 304-314 and any one or more of layer decoders 402-412, respectfully. It is noted that each of the layer encoders 304-314 can be designed in the same general manner with respect to their corresponding layers, as, for example, depicted in FIG. 3, to favor particular purposes. Conversely, the layer encoders may be configured differently to better utilize their unique characteristics, as understood in view of the teachings provided herein. Similarly, decoders 402-412 can be designed in the same general manner with respect to their corresponding layers, as, for example, depicted in FIG. 4. Conversely, the layer decoders may be configured differently to better utilize their unique characteristics.

It should be noted that with regard to an MVC encoder, the input is composed of multiple views. Each view is a traditional 2D video. Thus, compared to an AVC encoder, the typical MVC encoder includes additional blocks such as a disparity estimation block, a disparity compensation block, and an inter-view reference buffer. Analogously, FIGS. 3 and 4 include blocks for 3DV references and inter-layer prediction. With a 3DV encoder, the input is composed of multiple 3D views. As stated above, each 3D view can comprise several layers. Accordingly, the encoding method for each layer can be designed differently to utilize their unique features. Consequently, a 3DV encoder can be divided into layer encoders, as shown in FIG. 1. However, the layer encoders may also be closely coupled. The techniques used in the layer encoders may be tailored as desired for a given system. Since each layer appears as a video signal, the layers can have a similar structure at a high level as shown in FIG. 3. It should be noted the layer encoders can be differently designed at lower, more specific levels. Of course, one embodiment may also use a single encoder configured to encode all layers.

With regard to the high level diagram illustrated in FIG. 3, 3DV layer encoder 500 may include a layer partitioner 504 configured to receive and partition 3DV view layers from each other for a 3DV view i within input signal 502. The partitioner 504 is in signal communication with an adder or combiner 506, with a displacement (motion/disparity) compensation module 508, and with a displacement (motion/disparity) estimation module 510, each of which receives a set of partitioned layers from partitioner 504. Another input to the adder 506 is one of a variety of possible reference picture information received through switch 512.

For example, if a mode decision module 536 in signal communication with the switch 512 determines that the encoding mode should be intra-prediction with reference to the same block or slice currently being encoded, then the adder receives its input from intra-prediction module 530. Alternatively, if the mode decision module 536 determines that the encoding mode should be displacement compensation and estimation with reference to a block or slice, of the same frame or 3DV view or 3DV layer currently being processed or of another previously processed frame or 3DV view or 3DV layer, that is different from the block or slice currently being encoded, then the adder receives its input from displacement compensation module 508, as shown in FIG. 3. Further, if the mode decision module 536 determines that the encoding mode should be 3DV inter-layer prediction with reference to a 3DV layer, of the same frame or 3DV view currently being processed or another previously processed frame or 3DV view, that is different from the layer currently being processed, then the adder receives its input from the 3DV inter-layer prediction module 534, which is in signal communication with 3DV Reference Buffer 532.

The adder 506 provides a signal including 3DV layer(s) and prediction, compensation, and/or estimation information to the transform module 514, which is configured to transform its input signal and provide the transformed signal to quantization module 516. The quantization module 516 is configured to perform quantization on its received signal and output the quantized information to an entropy encoder 518. The entropy encoder 518 is configured to perform entropy encoding on its input signal to generate bitstream 520. The inverse quantization module 522 is configured to receive the quantized signal from quantization module 516 and perform inverse quantization on the quantized signal. In turn, the inverse transform module 524 is configured to receive the inverse quantized signal from module 522 and perform an inverse transform on its received signal. Modules 522 and 524 recreate or reconstruct the signal output from adder 506.

The adder or combiner 526 adds (combines) signals received from the inverse transform module 524 and the switch 512 and outputs the resulting signals to intra prediction module 530 and deblocking filter 528. Further, the intra prediction module 530 performs intra-prediction, as discussed above, using its received signals. Similarly, the deblocking filter 528 filters the signals received from adder 526 and provides filtered signals to 3DV reference buffer 532.

The 3DV reference buffer 532, in turn, parses its received signal. The 3DV reference buffer 532 aids in inter-layer and displacement compensation/estimation encoding, as discussed above, by elements 534, 508, and 510. The 3DV reference buffer 532 provides, for example, all or part of various 3DV layers.

With reference again to FIG. 4, the 3DV layer decoder 600 can be configured to receive bitstream 318 using bitstream receiver 602, which in turn is in signal communication with bitstream parser 604 and provides the bitstream to parser 604. The bit stream parser 604 can be configured to transmit a residue bitstream 605 to entropy decoder 606, transmit control syntax elements 607 to mode selection module 622, transmit displacement (motion/disparity) vector information 609 to displacement compensation (motion/disparity) module 618 and transmit coding information 611 from 3DV layers other than the 3DV layer currently decoded to 3DV inter-layer prediction module 620. The inverse quantization module 608 can be configured to perform inverse quantization on an entropy decoded signal received from the entropy decoder 606. In addition, the inverse transform module 610 can be configured to perform an inverse transform on an inverse quantized signal received from inverse quantization module 608 and to output the inverse transformed signal to adder or combiner 612.

Adder 612 can receive one of a variety of other signals depending on the decoding mode employed. For example, the mode decision module 622 can determine whether 3DV inter-layer prediction, displacement compensation, or intra prediction encoding was performed on the currently processed block by the encoder 500 by parsing and analyzing the control syntax elements 607. Depending on the determined mode, model selection control module 622 can access and control switch 623, based on the control syntax elements 607, so that the adder 612 can receive signals from the 3DV inter-layer prediction module 620, the displacement compensation module 618 or the intra prediction module 614.

Here, the intra prediction module 614 can be configured to, for example, perform intra prediction to decode a block or slice using references to the same block or slice currently being decoded. In turn, the displacement compensation module 618 can be configured to, for example, perform displacement compensation to decode a block or a slice using references to a block or slice, of the same frame or 3DV view or 3DV layer currently being processed or of another previously processed frame or 3DV View or 3DV layer, that is different from the block or slice currently being decoded. Further, the 3DV inter-layer prediction module 620 can be configured to, for example, perform 3DV inter-layer prediction to decode a block or slice using references to a 3DV layer, of the same frame or 3DV view currently processed or of another previously processed frame or 3DV view, that is different from the layer currently being processed.

After receiving prediction or compensation information signals, the adder 612 can add the prediction or compensation information signals with the inverse transformed signal for transmission to a deblocking filer 602. The deblocking filter 602 can be configured to filter its input signal and output decoded pictures. The adder 612 can also output the added signal to the intra prediction module 614 for use in intra prediction. Further, the deblocking filter 602 can transmit the filtered signal to the 3DV reference buffer 616. The 3DV reference buffer 316 can be configured to parse its received signal to permit and aid in inter-layer and displacement compensation decoding, as discussed above, by elements 618 and 620, to each of which the 3DV reference buffer 616 provides parsed signals. Such parsed signals may be, for example, all or part of various 3DV layers.

It should be understood that systems/apparatuses 300, 400, 500, and 600 can be configured differently and can include different elements as understood by those of ordinary skill in the art in view of the teachings disclosed herein.

Figure 5:
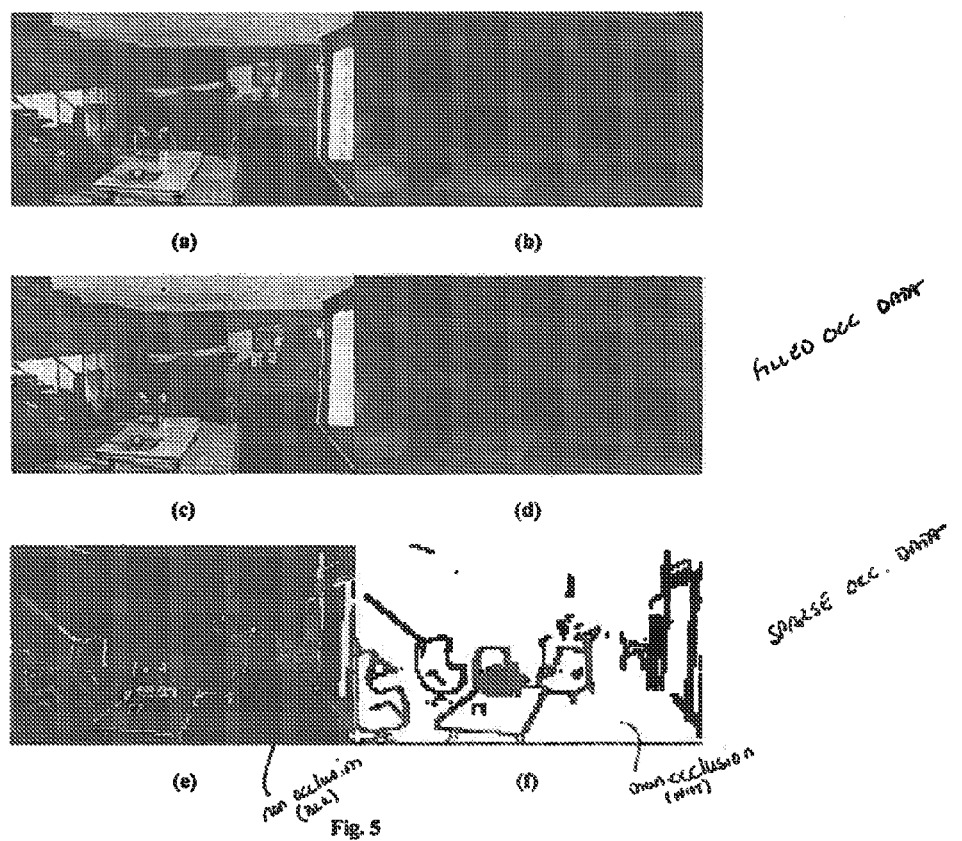
FIG. 5 shows the components of the LDV format in (a)-(f), where (c) and (d) represent filled occlusion data and where (e) and (f) represent sparse occlusion data, which can be employed in place of (c) and (d), respectively.

Occlusion data plays a key role in Layered Depth Video (LDV) format. FIG. 5 shows the components of the LDV format in (a)-(f). There are four components in the LDV video format: color video (FIG. 5(*a*)), depth (FIG. 5(*b*)), occlusion video (FIG. 5(*c/e*)), and occlusion depth (FIG. 5(*d*/f)). Color video is shown in FIG. 5(*a*); depth is shown in FIG. 5(*b*). FIG. 5(*c*) shows the occlusion video with the non-occlusion area filled by the corresponding pixels from color video. FIG. 5(*d*) depicts the occlusion depth with the non-occlusion area being filled by the corresponding depth samples from the depth. FIG. 5(*c*) and (*d*) represents filled occlusion video and depth data, respectively. In an alternate configuration, FIG. 5(*e*) and (*f*) represents sparse occlusion video and depth data, respectively. The sparse occlusion data can be used in place of the filled occlusion data or vice versa.

In FIGS. 5(*e*) and 5(*f*), the non-occlusion area is shown as black for occlusion video and white for occlusion depth. Normally, occlusion data will be represented as shown in FIGS. 5(*c*) and (*d*), which is known as filled occlusion data herein. When the occlusion data has the non-occlusion area(s) filled by a certain uniform color as shown in FIGS. 5(*e*) and (*f*), such as black or white, this representation is known as sparse occlusion data herein.

For the purpose of rendering video for a viewer, it should be understood that the sparse occlusion data is considered to be equivalent to the counterpart filled occlusion data because the non-occlusion area is generally not referred to in 3D warping and hole filling operations at all. So it is possible to encode either the filled occlusion data or the sparse occlusion data in the LDV format without any confusion or loss of generality.

Sparse and filled occlusion data are equivalent to each other and interchangeable in terms of rendering. However, a rendering process may need to know if a pixel belongs to occlusion area or non-occlusion area such as when performing a hole filling process in rendering. In such a case, when a hole pixel resides in an occlusion area, the occlusion data can be used to fill the hole pixel. Otherwise, neighboring background pixels can be used to fill the hole pixel.

As noted above, the indication of the occlusion format is useful at least in assisting the determination of occlusion area or non-occlusion area. An indication of occlusion data format can be included in a high level syntax for the 3D video signal. As used herein, "high level syntax" refers to syntax present in the bitstream that resides hierarchically above the macroblock layer. For example, high level syntax, as used herein, may refer, but is not limited, to syntax at the slice header level, Supplemental Enhancement Information (SEI) level, Picture Parameter Set (PPS) level, Sequence Parameter Set (SPS) level, View Parameter Set (VPS), and Network Abstraction Layer (NAL) unit header level. Table 2 presents an example of modified SPS to include such an indicator flag, where the extended SPS for 3DV sequences is employed as an example.

TABLE 2

Modified SPS

| seq_parameter_set_3dv_extension( ) { | C | Descriptor |
|---|---|---|
|    num_3dv_layer_minus1 | | ue(v) |
|    for( i = 0; i <= num_3dv_layer_minus1; i++ ) | | |
|       3dv_layer_id[ i ] | | ue(v) |
|    for( i = 1; i <= num_3dv_layer_minus1; i++ ) { | | |
|       num_3dv_layer_refs_l0[ i ] | | ue(v) |
|       for( j = 0; j < num_3dv_layer_refs_l0[ i ]; j++ ) | | |
|          3dv_layer_ref_l0[ i ][ j ] | | ue(v) |
|       num_3dv_layer_refs_l1[ i ] | | ue(v) |
|       for( j = 0; j < num_3dv_layer_refs_l1[ i ]; j++ ) | | |
|          3dv_layer_ref_l1[ i ][ j ] | | ue(v) |
|    } | | |
|    occlusion_data_format | | u(2) |
| } | | |

The semantics for all the shaded entries in Table 2 above have been completely described in the commonly owned and co-pending PCT Application No. PCT/US2010/001286 on at least pages 50-55 with respect to Table 13 therein. The semantics of the remaining entry occlusion_data_format are as follows:

value of 0 indicates the coded occlusion video/depth is filled occlusion data;

value of 1 indicates the coded occlusion video/depth is sparse occlusion data; and values larger than 1 are reserved at this time.

FIGS. 6 and 7 show flowcharts for one embodiment of encoding and decoding of occlusion data involving an indication of sparse and filled occlusion data together with a keying technique for the occlusion data. The steps of these processes will be described in more detail immediately below.

The encoding method in FIG. 6 starts at step S601. Control is passed directly t step S602. At step S602, a determination is made about the input occlusion data format originally received by the encoder. Although other techniques may be employed for this determination, one exemplary straightforward technique analyzes an indicator or an indication of the occlusion data format that is associated with the received video frame. One embodiment of the indicator is shown above as the occlusion_data_format entry in the high level syntax. The indicator characterizes the associated occlusion data as being in a "filled" format or in a "sparse" format. In some cases, this indicator is also referred to as a flag. When the indicator indicates that sparse occlusion data is received by the encoder, control is transferred to step S603. When the indicator indicates that filled occlusion data is received by the encoder, control is transferred to step S604.

In step S603, the sparse occlusion data is encoded using a standard video encoding technique to produce encoded occlusion data. Standard video encoding techniques include, but are not limited to, Multiview Video Coding (MVC), H.264/Advanced Video Coding (AVC), and MPEG coding including at least MPEG-2. These coding techniques are standardized and are understood to be well known to persons of ordinary skill in this technical field. No further description of these techniques will be presented herein. Control is transferred to step S605.

In step S605, the bitstream is prepared for transmission. The bitstream includes the encoded occlusion data together with the indicator of occlusion data format (i.e., the indication of sparse or filled) for the originally received occlusion data. Control is transferred to step S606, where the encoding method ends.

In step S604, the received occlusion data is processed to change the occlusion data format from a filled format to a sparse format. When the received occlusion data is represented in the sparse format, each non-occlusion area is represented as a defined characteristic, such a defined color or data value. This is accomplished by replacing data samples in the non-occlusion area by a defined characteristic such as a defined color or a defined depth level such that sparse occlusion data format results. The process is similar to color keying techniques wherein a color in one image is used to reveal another image behind. The change in representation to a sparse occlusion data format is more preferable than the converse (i.e., sparse format changed to filled format) because of efficiencies that arise from the standard coding techniques.

Efficiencies are obtained through conventional encoding because most of the non-occlusion area uniformly represented with certain uniform color can be coded in skip mode. In skip mode encoding, a macroblock is coded as a skipped macroblock thereby reducing the amount of data in the encoded occlusion data output by the encoder. When skip mode coding is used, the decoder decodes the macroblock by referring to motion vectors of the surrounding macroblocks and/or partitions within surrounding macroblocks. Skip mode coding is understood to be well known to persons of ordinary skill in this technical field. No further description of this coding technique will be presented herein. Control is then transferred to step S603.

In this step, it is necessary to identify at least one occlusion area and at least one non-occlusion area for the occlusion data. These occlusion areas will be mutually exclusive of each other. Identification allows the non-occlusion areas to be filled with a defined characteristic, such as the defined color.

One exemplary technique for performing such an identification of occlusion or non-occlusion areas includes the use of the depth data, which is from the same frame as the occlusion data, for detecting one or more depth discontinuities in the video data frame associated with the occlusion data. The area along each detected depth discontinuity is then classified as an occlusion area in the occlusion data. Other techniques may be utilized to perform the detection and/or classification described herein.

In another exemplary technique, the video data is input together with the filled occlusion data. Non-occlusion areas are exposed by calculating the difference frame between the video frame and the filled occlusion video frame. Samples in a non-occlusion area will have a value of zero or close to zero within the difference frame.

The decoding method in FIG. 7 starts at step S701. Control is transferred directly to step S702. In step S702, the indicator or flag representing the occlusion data format for the occlusion data originally received at the encoder is extracted. This flag or indicator identifies the occlusion data format as either the sparse occlusion data format or the filled occlusion data format. It should be recalled that the encoder actually outputs encoded occlusion data in the sparse data format as described above in reference to the encoding method in FIG. 6. Control is then transferred to step S703.

In step 703, the sparse occlusion data is decoded using a standard video decoding technique to produce decoded occlusion data. Standard video decoding techniques include, but are not limited to, Multiview Video Coding (MVC), H.264/Advanced Video Coding (AVC), and MPEG coding including at least MPEG-2. Control is transferred to step S704.

In step S704, a determination is made concerning the occlusion data format for the occlusion data originally received at the encoder. This determination is based at least in part on the flag or indicator extracted in step S702. When the indicator indicates that sparse occlusion data was originally received by the encoder (FIG. 6), control is transferred to step S705. When the indicator indicates that filled occlusion data was originally received by the encoder (FIG. 6), control is transferred to step S706.

In step S705, the decoded occlusion data is output in either a sparse occlusion data format (from step S704) or a filled occlusion data format (from step S706). The method ends at step S707.

Step S706 is entered because it had been determined in step S704 that the occlusion data originally received by the encoder was in a filled occlusion data format as identified by the received flag or indicator extracted in step S702. As mentioned above, step S704 outputs decoded occlusion data in the sparse data format. In order to convert the sparse occlusion data format to the originally received filled occlusion data format, it is necessary to fill the non-occlusion area, identified by the defined characteristic such as the defined color, for example, with the collocated data sample in the corresponding video or depth component of the frame. When the occlusion data is the occlusion video, then the corresponding video component from the same frame is used for filling the non-occlusion area data samples in the decoded occlusion data. Similarly, when the occlusion data is the occlusion depth component, then the corresponding depth component from the same frame is used for filling the non-occlusion area data samples in the decoded occlusion data. When the decoded occlusion data is converted back into the proper originally received format, control is transferred to step S705.

In another embodiment of the present invention, the location of the occlusion data, which can be either occlusion video or occlusion depth, is changed in the reference picture list. Construction of the reference picture list typically appends the inter-layer reference pictures after the temporal pictures and the inter-view reference pictures in the reference picture list. Examples of various reference picture lists are described in PCT Application No. PCT/US2010/001291, which has been identified above. In this regard, see also commonly owned U.S. patent application Ser. No. 2010/0118933 for Pandit et al. In the present invention, when encoding occlusion data, the reference picture from the video layer is positioned at location 0 in the reference picture list. In other words, when encoding occlusion data, the 2D data having the same timestamp (i.e., the same video frame) is placed at location 0 in the reference picture list.

When occlusion data is encoded using this reordered reference picture list, it is possible to obtain some coding efficiency in dealing with the blocks in the non-occlusion area. It should be noted that the encoding described herein can be applied to either the occlusion video data or the occlusion depth data and that data can be in either a sparse occlusion data format or a filled occlusion data format. The coding efficiency is gained because skip mode encoding can be applied during encoding of the non-occlusion areas so that the depth or video data corresponding to the non-occlusion area(s) is directly copied without any further modification to the data in the non-occlusion area. This efficiency is made possible by having the non-occlusion area information immediately available from the occlusion video or depth data at location 0 in the reference picture list.

Identification of the non-occlusion areas is achieved through any of the techniques discussed above in reference to step S604 in FIG. 6. Any well known techniques for determining and identifying non-occlusion areas, and even occlusion areas, are contemplated for the same use herein. When a block (i.e., macroblock) of video data is identified as being in, or associated with, a non-occlusion area, the encoder selects skip mode encoding for that block. When a block of video data is identified as being in or associated with an occlusion area, the encoder selects a coding mode for that block based on the rate distortion cost (i.e., RD cost). The RD cost of an encoding solution often accounts for the distortion in the encoded macroblock and counts the actual bits that would be generated for the encoding solution. The computation and use of RD cost in video encoding is believed to be a well known process and is not described in any further detail herein.

For the decoder realized in accordance with this aspect of the present invention, data from the video reference frame is copied to the non-occlusion block. If a sparse occlusion data format is desired at the decoder, the copy process in the decoder is skipped and the decoder simply fills the block by the defined characteristic, such as the defined color described above.

FIGS. 8 and 9 show flowcharts for an embodiment of encoding and decoding for occlusion data based on a reordering of the reference picture list and the use of skip mode for encoding/decoding certain occlusion data, as discussed above.

The encoding method in FIG. 8 commences at step S801. Control is immediately transferred to step S802.

In step S802, the reference picture list is arranged by placing the 2D data having the same timestamp at location 0. The term "2D data" is understood to include one or both of the 2D video data and the depth data. Control is then transferred to step S803.

It is to be understood that the preferred embodiment of the present invention is realized by processing the received occlusion data to change the occlusion data format from a filled format to a sparse format. This has been described above with respect to FIG. 6. When the received occlusion data is represented in the sparse format, each non-occlusion area is represented as a defined characteristic, such a defined color or data value. This is accomplished by replacing data samples in the non-occlusion area by a defined characteristic such as a defined color or a defined depth level such that sparse occlusion data format results. The process is similar to color keying techniques wherein a color in one image is used to reveal another image behind. The change in representation to a sparse occlusion data format is more preferable than the converse (i.e., sparse format changed to filled format) because of efficiencies that arise from the standard coding techniques.

In step S803, encoding of the data is performed. When the block of data being encoded is identified as being in a non-occlusion area, encoding is performed using skip mode encoding for that block. Otherwise, for a block of data identified as not being in a non-occlusion area (i.e., being in an occlusion area), the coding mode is selected on the conventional basis of rate distortion cost (RD cost). Control is then transferred to step S804.

In step S804, the bitstream is prepared for output transmission. The bitstream includes the encoded occlusion data together with the indicator or flag occlusion data format (i.e., the indication of sparse or filled) for the originally received occlusion data. This indicator has been described in detail above with respect to FIG. 6, for example. Control is transferred to step S805, where the encoding method ends.

The decoding method in FIG. 9 commences at step S901. Control is immediately transferred to step S902.

In step S902, the reference picture list is again arranged by placing the 2D data having the same timestamp at location 0. As noted above, the term "2D data" is understood to include one or both of the 2D video data and the depth data. Control is then transferred to step S903.

In step S903, all macroblocks in the slice or picture are decoded in the conventional video decoding manner. Control is then transferred to step S904.

In step S904, on the basis of the indicator or flag received with the video data, one of two possible techniques are used for the occlusion data. When the indicator identifies the occlusion data format as sparse for the originally received occlusion data, the non-occlusion areas are filled with the defined characteristic, such as the defined color or defined depth value. When the indicator identifies the occlusion data format as filled for the originally received occlusion data, the non-occlusion areas are filled with the data samples from the corresponding portions of the 2D video. Control is then transferred to step S905, where the decoding method ends for this data.

It is recognized herein that, for the revised reference picture list construction described in the embodiment above, the reference picture index is not necessarily optimized for coding the occlusion blocks. This issue regarding optimization arises because blocks in occlusion areas are likely to use a temporal reference picture for best matching instead of inter-layer reference picture. On the other hand, it is not necessarily good for the blocks in non-occlusion areas to put the layer reference picture at the end of the reference picture list as is shown in PCT Application No. PCT/US2010/001291, identified above. Thus, the rearrangement of the reference picture list may not alone provide a completely suitable and effective solution for encoding/decoding blocks, both blocks associated with occlusion areas and blocks associated with non-occlusion areas.

Another embodiment of an encoder and decoder method for occlusion data involves the use of depth and the detection of depth boundaries. This embodiment is depicted in FIGS. 10 and 11. FIGS. 10 and 11 show flowcharts for encoding and decoding of occlusion data involving the use of depth skip mode encoding for certain occlusion data. As explained above, the techniques herein are applicable to both occlusion video data and occlusion depth data, interchangeably.

In order to favor the coding of both the occlusion area blocks and the non-occlusion area blocks, for this embodiment of the present invention, the reference picture list is arranged by appending inter-layer reference pictures at the end of the reference picture list. Examples of such a reference picture list are described in PCT Application No. PCT/US2010/001291.

During the encoding process, boundary detection is performed on the reconstructed depth samples to determine the proximity of the current macroblock to a detected depth boundary, usually measured in pixels. The reconstructed depth samples are available usually at the output of deblocking filter 528 in the encoder of FIG. 3. The reconstructed depth samples are used in the encoder because the encoder and decoder must use substantially the same information for boundary detection, and because the reconstructed depth samples (map) are the only samples available in the decoder. The decoder does not have the original depth data present in the encoder. So it would not be proper for the encoder to utilize the original depth samples for boundary detection, if one maintains the constraint that the encoder and decoder must use substantially the same depth information.

If it is determined that a macroblock is within l pixels of a detected depth boundary, then this macroblock is marked as an occlusion area macroblock, and the encoding mode is selected using rate distortion (RD) cost as explained above. On the other hand, if it is determined that a macroblock is not within l pixels of a detected depth boundary, then the inter-layer skip encoding mode will be used to encode this macroblock.

In decoding, the blocks encoded via skip mode encoding utilize the depth data in the following way. Distance between the macroblock and the depth boundary is determined. For any macroblock that was skipped in the encoding process, when distance from the macroblock to the nearest detected depth boundary is at or within (i.e., less than) a threshold of l pixels, that macroblock is identified as a temporally skipped block. Otherwise, when the distance from the skipped macroblock to the nearest detected depth boundary is greater than (i.e., beyond) the threshold of l pixels, that macroblock is identified as non-occlusion area macroblock, and it is further deemed to be an inter-layer skipped macroblock.

Detection of the depth boundary is important to the operation of the codec embodiment. It is noted that the depth boundary should be detected in the decoder preferably using the same algorithm as was used in the encoder. This insures that the reconstructed depth samples have identical reconstruction at the encoder and at the decoder. Depth boundary detection may be accomplished by any number of well known techniques. These well known techniques will not be described further herein.

The encoding method in FIG. 10 commences at step S1001. Control is immediately transferred to step S1002. At step S1002, the reference picture list is arranged by placing the 2D data having the same timestamp after both the temporal and inter-view reference pictures in the reference picture list. Control is then transferred to step S1003.

In step S1003, one or more depth boundaries are detected from a reconstructed depth map. The distance from each macroblock to the closest depth boundary is measured. When the distance from a macroblock to its closest depth boundary is less than or equal to l pixels, the macroblock is marked as an occlusion area macroblock. Otherwise, the macroblock is a non-occlusion area macroblock. Since the mark or flag identifies the macroblock as being an occlusion area macroblock, the absence of the mark or flag automatically identifies the associated macroblock as being a non-occlusion area macroblock. It should be noted that a two state flag will suffice to identify each macroblock properly as either a non-occlusion area macroblock (e.g., flag=0) or an occlusion area macroblock (e.g., flag=1). Control is then transferred to step S1004.

In step S1004, the flag or mark for the macroblock is read. When the mark indicates that the macroblock is a non-occlusion area macroblock, the conventional skip mode encoding is used to encode the macroblock. When the mark indicates that the macroblock is an occlusion area macroblock, an encoding mode is selected and used based on conventional rate distortion cost (RD cost). Control is then transferred to step S1005.

In step S1005, the bitstream is prepared for output transmission. The bitstream includes the encoded occlusion data together with the indicator or flag occlusion data format (i.e., the indication of sparse or filled) for the originally received occlusion data. This indicator has been described in detail above with respect to FIG. 6, for example. Control is transferred to step S1006, where the encoding method ends.

The decoding method in FIG. 11 commences at step S1101. Control is immediately transferred to step S1102.

At step S1102, the reference picture list is arranged by placing the 2D data having the same timestamp after both the temporal and inter-view reference pictures in the reference picture list. Control is then transferred to step S1103.

In step S1103, just as in step S1002 for the encoding method, one or more depth boundaries are detected from a reconstructed depth map. The distance from each macroblock to the closest depth boundary is measured. When the distance from a macroblock to its closest depth boundary is less than or equal to 1 pixels, the macroblock is marked as an occlusion area macroblock. Otherwise, the macroblock is a non-occlusion area macroblock. Since the mark or flag identifies the macroblock as being an occlusion area macroblock, the absence of the mark or flag automatically identifies the associated macroblock as being a non-occlusion area macroblock. As described above with respect to FIG. 10, a two state flag will suffice to identify each macroblock properly as either a non-occlusion area macroblock (e.g., flag=0) or an occlusion area macroblock (e.g., flag=1). Control is then transferred to step S1104.

Macroblock decoding is then performed in step S1104. Decoding is performed initially on the basis of the indicators or flags received with the video data: one flag or mark indicating the macroblock as being a non-occlusion/occlusion area macroblock and the other indicator or flag identifying the occlusion data format as sparse or filled. First, all macroblocks in the slice or picture are decoded in the conventional video decoding manner, similar to the step S903 shown in FIG. 9.

When a skipped macroblock is identified by one flag that indicates a non-occlusion area macroblock and the other indicator that identifies the occlusion data format as sparse for the originally received occlusion data, the non-occlusion areas are filled with the defined characteristic, such as the defined color or defined depth value. When a skipped macroblock is identified by one flag that indicates a non-occlusion area macroblock and the other indicator that identifies the occlusion data format as filled for the originally received occlusion data, the non-occlusion areas are filled with the data samples from the corresponding portions of the 2D video. For all other macroblocks, conventional decoding is used, as noted above. Control is then transferred to step S1105, where the decoding method ends for this data.

FIGS. 12 and 13 show flowcharts for another embodiment of encoding and decoding of occlusion data employing an update mechanism, realized in accordance with the principles of the present invention, involving the use of an update mechanism for occlusion data.

In this embodiment, it is expected that the occlusion frames are substantially identical or constant from one frame to the next over a defined period of time (or frames). On the encoder side, the occlusion data may be obtained by using one representative occlusion data frame. Alternatively, a number of consecutive occlusion data frames from a video scene may be merged in a combinatorial manner to realize the representative occlusion data frame. For both encoding and decoding, the representative occlusion data frame is then valid for a defined number of frames (i.e., period of time) until it is replaced by a new representative occlusion data frame. This method can be applied on either the occlusion video data or occlusion depth data.

In order to realize this technique, it is necessary to determine the number of frames n over which the representative occlusion data frame is valid until the next update. Additionally, it is necessary to include that number of frames n over which the representative occlusion data frame is valid until the next update in a syntax transmitted via a message from the encoder to the decoder so that the decoder can operate properly. While the frames over which the representative occlusion data frame is valid are generally intended to be consecutive, it is contemplated that the frames may even be non-consecutive under certain circumstances. For example, when two scenes are switched frequently, the occlusion data for one scene can be used for the frames related to that scene in the alternating scene sequence. Since those frames are alternated with frames from a second scene, the number n for the period actually covers non-consecutive frames.

FIG. 12 shows a flowchart for realizing encoding occlusion data employing the use of an update mechanism. The method starts at step S1201, for which control is passed to step S1202.

In step S1202, the time period n is determined. This time period is generally expressed as an integer number of frames. It represents the period over which a single representative occlusion data frame (video or depth) is valid. Control is passed to step S1203.

In step S1203, the representative occlusion data frame is encoded. No encoding or transmission is performed on the next n-1 consecutive occlusion data frames. They are effectively skipped. The representative occlusion data frame may be one occlusion data frame selected from n consecutive occlusion data frames in time period n over which the representative occlusion data frame is valid. As noted above, the representative occlusion data frame may be a combination of the characteristics of two or more occlusion data frames selected from n consecutive occlusion data frames in time period n over which the representative occlusion data frame is valid. Control is passed to step S1204.

In step S1204, the encoded representative occlusion data frame is transmitted along with a syntax message indicating the period, n. Control is passed to step S1205.

In decision step S1205, it is determined whether the period n has expired so that a new representative occlusion data frame can be encoded to update and replace the current representative occlusion data frame. If the time period has expired and there is another representative occlusion data frame ready for encoding, then control is passed back to step S1202. If there are no more occlusion data frames ready for encoding, then control is passed to step S1206 where the process ends.

In this embodiment, a decoded occlusion frame will remain valid for its associated frame and all n-1 subsequent consecutive frames in decoding order until another representative occlusion frame is decoded to update and replace the prior representative occlusion frame.

The decoding process starts at step S1301, where control is passed to step S1302. In step S1302, the syntax message is decoded to determine the period n. Control is passed to step S1303.

In step S1303, the representative occlusion data frame is decoded. That representative occlusion data frame is then maintained as valid for period n, that is, for the next n-1 consecutive frames. Control is passed to step S1304.

In decision step S1304, it is determined whether the period n has expired so that a new representative occlusion data frame can be decoded to update and replace the current representative occlusion data frame. If the time period n has expired and there is another representative occlusion data frame ready for decoding, then control is passed back to step S1302. If there are no more occlusion data frames ready for decoding, then control is passed to step S1305 where the process ends.

The methods described herein are contemplated for use in computer processor based implementations, or on computer readable storage media, or in other apparatus such as the coding/decoding apparatus depicted in FIGS. 1-4 herein.

The above descriptions and illustrations of the coding and decoding occlusion data are exemplary of the various embodiments of the present invention. Certain modifications and variations such as the use of different types of occlusion data, different orders of performing certain encoding or decoding steps, or even omitting one or more steps in a method, may also be used to practice of the present invention.

All examples and conditional language recited herein are intended for pedagogical purposes to aid the reader in understanding the present principles and the concepts contributed by the inventor to furthering the art, and are to be construed as being without limitation to such specifically recited examples and conditions.

Moreover, all statements herein reciting principles, aspects, and embodiments of the present invention, as well as specific examples thereof, are intended to encompass both structural and functional equivalents thereof. Additionally, it is intended that such equivalents include both currently known equivalents as well as equivalents developed in the future, including any elements developed at any that perform the same function, regardless of structure.

A number of implementations have been described herein. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. In particular, although illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. Accordingly, these and other implementations are contemplated by this application and are within the scope of the following claims.

The invention claimed is:

1. A method for processing occlusion data in a sequence of video data frames, said method comprising:
    determining a format for said occlusion data, said format selected from a one of a sparse occlusion data format and a filled occlusion data format; when the format for said occlusion data is determined to be said filled occlusion data format,
    converting said occlusion data into a sparse occlusion data format before encoding;
    arranging 2D data, which is associated with said occlusion data, at location 0 in a reference picture list;
    identifying at least one of an occlusion area macroblock and a non-occlusion area macroblock for said occlusion data;
    encoding said occlusion data to produce encoded occlusion data, wherein for each non-occlusion area macroblock said encoding is realized by skip mode encoding, and wherein for each occlusion area macroblock said encoding is realized by selecting an encoding mode based on rate distortion cost; and
    outputting said encoded occlusion data together with an indicator representative of the format determined for said occlusion data.

2. The method as defined in claim 1, wherein said occlusion data includes one of occlusion video data and occlusion depth data, and wherein said 2D data includes 2D video data when said occlusion data is occlusion video data and wherein said 2D data includes depth data when said occlusion data is occlusion depth data.

3. The method as defined in claim 1, wherein said encoding is performed in accordance with a video coding standard including one of H.264/AVC, MVC, and MPEG-2.

4. An apparatus for processing occlusion data in a sequence of video data frames, said apparatus comprising an encoder for:
    determining a format for said occlusion data, said format selected from a one of a sparse occlusion data format and a filled occlusion data format; when the format for said occlusion data is determined to be said filled occlusion data format,
    converting said occlusion data into a sparse occlusion data format before encoding; arranging 2D data, which is associated with said occlusion data, at location 0 in a reference picture list; identifying at least one of an occlusion area macroblock and a non-occlusion area macroblock for said occlusion data;
    encoding said occlusion data to produce encoded occlusion data, wherein for each non-occlusion area macroblock said encoding is realized by skip mode encoding, and wherein for each occlusion area macroblock said encoding is realized by selecting an encoding mode based on rate distortion cost; and
    outputting said encoded occlusion data together with an indicator representative of said format determined for said occlusion data.

5. The apparatus as defined in claim 4, wherein said occlusion data includes one of occlusion video data and occlusion depth data, and wherein said 2D data includes 2D video data when said occlusion data is occlusion video data and wherein said 2D data includes depth data when said occlusion data is occlusion depth data.

6. The apparatus as defined in claim 4, wherein said encoding is performed in accordance with a video coding standard including one of H.264/AVC, MVC, and MPEG-2.

7. A method for processing occlusion data in a sequence of video data frames, said method comprising:
    extracting an indicator representative of an original format for received occlusion data, said original format selected from one of a sparse occlusion data format and a filled occlusion data format; arranging 2D data, which is associated with said occlusion data, at location 0 in a reference picture list;
    decoding said occlusion data to produce decoded occlusion data; when said indicator indicates said sparse occlusion data format for said occlusion data, filling a non-occlusion area of said occlusion data with data indicative of a defined characteristic to produce decoded occlusion data;
    when said indicator indicates said filled occlusion data format for said occlusion data, replacing said occlusion data in a non-occlusion area of said occlusion data with sample values from a corresponding area of associated 2D data to produce decoded occlusion data; outputting said decoded occlusion.

8. The method defined in claim 1, said method further including:
identifying at least one of an occlusion area and a non-occlusion area for the occlusion data.

9. The method as defined in claim 1, wherein said occlusion data includes one of occlusion video data and occlusion depth data, and wherein said 2D data includes 2D video data when said occlusion data is occlusion video data and wherein said 2D data includes depth data when said occlusion data is occlusion depth data.

10. The method as defined in claim 1, wherein said decoding is performed in accordance with a video coding standard including one of H.264/AVC, MVC, and MPEG-2.

11. An apparatus for processing occlusion data in a sequence of video data frames, said apparatus comprising a decoder for:
extracting an indicator representative of an original format for received occlusion data, said original format selected from one of a sparse occlusion data format and a filled occlusion data format; arranging 2D data, which is associated with said occlusion data, at location 0 in a reference picture list;
decoding said occlusion data to produce decoded occlusion data; when said indicator indicates said sparse occlusion data format for said occlusion data,
filling a non-occlusion area of said occlusion data with data indicative of a defined characteristic to produce decoded occlusion data;
when said indicator indicates said filled occlusion data format for said occlusion data, replacing said occlusion data in a non-occlusion area of said occlusion data with sample values from a corresponding area of associated 2D data to produce decoded occlusion data;
outputting said decoded occlusion.

12. The apparatus defined in claim 11, said decoder further identifying at least one of an occlusion area and a non-occlusion area for the occlusion data.

13. The apparatus as defined in claim 11, wherein said occlusion data includes one of occlusion video data and occlusion depth data, and wherein said 2D data includes 2D video data when said occlusion data is occlusion video data and wherein said 2D data includes depth data when said occlusion data is occlusion depth data.

14. The apparatus as defined in claim 1, wherein said decoding is performed in accordance with a video coding standard including one of H.264/AVC, MVC, and MPEG-2.

* * * * *